Patented Nov. 9, 1943

2,333,639

UNITED STATES PATENT OFFICE 2,333,639

TREATMENT OF POLYESTERS AND PRODUCT THEREFROM

Robert Edward Christ and William Edward Hanford, Wilmington, Del., assignors to E. I. du Pont de Nemours & Company, Wilmington, Del., a corporation of Delaware No Drawing. Application July 2, 1940, Serial No. 343,646

19 Claims. (Cl. 260—75)

This invention relates to synthetic polymeric materials and particularly to a method for preparing tough, high molecular weight polymers.

The primary object of this invention is to provide a rapid and improved method for converting low molecular weight linear polyesters, and particularly polyesteramides, into high molecular weight polymers. Another object is the preparation of new, tough, high molecular weight polymers. Another object is the preparation of useful articles from these polymers, such as fibers, films, sheets, tubing, coating compositions, safety-glass interlayers, and molded articles. Another object is the provision of a process whereby modifying agents, inert and reactive, may be incorporated in the polymer. Other objects will appear hereinafter.

These objects are accomplished by the following invention wherein an organic polyisocyanate or polyisothiocyanate is reacted with a linear polymer having active hydrogen of the class consisting of hydroxyl, carboxyl, amino and amido hydrogen, and made from ingredients comprising a dibasic carboxylic acid or ester-forming derivative of such acid and at least one complementary bifunctional compound in which at least one function is an alcoholic hydroxyl group until a polymer of substantially higher molecular weight is formed.

In its preferred embodiment the invention is applied to low molecular weight polymers such as are obtained by heating a dibasic carboxylic acid with a complementary bifunctional reactant of the type mentioned above until the polymerization reaction becomes relatively slow. These "low molecular weight polymers," which are obtained in a few hours heating, are of insufficiently high molecular weight to be tough and cannot be formed into films, at least not into films having a useful degree of strength. By the the process of this invention, these polymers are converted into "high molecular weight" polymers, that is, polymers which are tough and can be formed into strong films. In general, the low molecular weight polymers will have molecular weights below 5000 and intrinsic viscosities, as defined in U. S. Patent 2,130,948, less than 0.5, usually in the range 0.1 to 0.4, whereas the high polymers will have molecular weights above 5000 and intrinsic viscosities above 0.5 or will be insoluble.

The low molecular weight polymers used in this process are readily prepared by a short polymerization process. However, a very long and carefully controlled heating cycle is required to convert these polymers into high molecular weight polymers by the usual method, i. e., by continued heating of the low molecular weight polymer under low pressure as in a molecular still. The process of the present invention provides a novel, simple, and excellent method for converting these polymers rapidly into high molecular weight polymers. This new process for preparing tough high molecular weight polymers from linear polyester-forming and from mixtures of linear polyester- and polyamide-forming reactants requires less than one-fifth the time of the prior processes and has made the production of the products practical from a commercial standpoint. Furthermore, high molecular weight polymers prepared by the process of the present invention have more desirable properties than those prepared by heating the low molecular weight polymers alone. In particular, the high molecular weight polymers of this invention are more resistant to hydrolysis than the polymers made by the known processes.

The polymers which in the present invention are reacted with the polyisocyanate or polyisothiocyanate are made from combinations of reactants of the general types noted below:

I. Glycols and dibasic acids
II. Amino alcohols and dibasic acids
III. Glycols, diamines and dibasic acids
IV. Glycols, amino alcohols and dibasic acids
V. Amino alcohols, diamines and dibasic acids
VI. Amino acids, glycols and dibasic acids
VII. Amino acids, amino alcohols and dibasic acids
VIII. Amino alcohols, glycols and dibasic acids
IX. Glycols, dibasic acids and hydroxycarboxylic acids
X. Amino alcohols, dibasic acids and hydroxycarboxylic acids It is advantageous to use a small excess of the alcoholic hydroxyl-containing constituent in preparing the polymers to be treated according to the process of this invention.

The preparation of tough, high molecular weight products involves the treatment of a low molecular weight polymer of any of the above classes with up to about 10%, preferably between 3 and 7%, of a polyisocyanate or a polyisothiocyanate, preferably a diisocyanate or diisothiocyanate, at reaction temperatures. At temperatures between 150–250° C., the reaction is quite rapid requiring only from 10 to 45 minutes. At lower temperatures (75–150° C.) the reaction will proceed but a longer heating period is required. Temperatures below 75° C. are impractical for most purposes, whereas temperatures above 300° C. lead to destructive decomposition.

Since the preferred embodiment involves the use of diisocyanates, the invention is described with particular reference to these reagents. Polymers prepared by treating low molecular weight polymers with diisocyanates according to the process of this invention may, or may not, produce soluble polymers depending on the amount of diisocyanate used. If just enough diisocyanate is added to take care of the end groups in the low polymers, a high molecular weight linear polymer is obtained which melts fairly sharply, can be formed into filaments which cold draw readily, and retains its original solubility. However, if an excess of diisocyanate is used, a cross-linked polymer results. The cross-linked polymers no longer retain their original solubility and, instead of melting sharply, soften gradually over a wide range. Furthermore, when extruded under force, they do not cold draw by necking down but merely stretch like rubber. As soon as the external force is removed they return to their original dimensions.

The final diisocyanate polymerization step may be conducted either in the presence or absence of solvents or diluents, and at atmospheric, superatmospheric, or subatmospheric pressures. The reaction is preferably conducted in the absence of oxygen or moisture, which may be accomplished, for example, by operating in a partial vacuum or in the presence of an inert gas such as nitrogen.

The following examples, in which parts are by weight, are illustrative of the preparation and application of the products of this invention.

*Example I*

A mixture containing 2.91 parts of hexamethylenediamine, 11.47 parts of ethylene glycol (10% excess) and 39.67 parts of sebacic acid is heated for 2 hours at 150° C./atm., followed by 6 hours at 200° C./2 mm. The resultant soft, waxy low polymer, in which ester linkages form about 87% of the total of ester and amide linkages, is treated with 2.75 parts of hexamethylene diisocyanate at 176° C. for 15 minutes during which time the pressure is gradually reduced to 2 mm. The product is a clear, transparent, tough, elastic polymer which softens at 125° C., and has an intrinsic viscosity of (0.63) and a tensile strength of 7,600 lbs./sq. in. based on the original dimensions (18,700 lbs./sq. in. at break).

It will be noted that the total heating cycle required to obtain the above high molecular weight polymer was 8.25 hours. If the diisocyanate or a similar agent had not been added, at least four days heating would have been required to obtain a polymer of comparable molecular weight, assuming that the reactions in each case were carried out on a two-pound scale.

*Example II*

A mixture of 50.43 parts of sebacic acid and 17.06 parts of ethylene glycol (10% excess) is heated for 2 hours at 150° C./atm. followed by 6 hours at 200° C./2 mm. The low molecular weight polymer, in which ester groups form 100% of the linkages between recurring units, which is obtained in this way is a soft, white polymer resembling beeswax. A total of 3.3 parts of hexamethylene diisocyanate is rapidly stirred into the low polymer and the heating is continued for ½ hour at 176° C. during which time the pressure is gradually reduced to 2 mm. The product thus obtained is a clear, colorless, tough polymer which has all the properties of a true linear superpolymer. It melts fairly sharply at 72° C., cold draws readily, and retains its original solubility, being soluble in chloroform, chloroform-alcohol mixtures, and ethylene chlorohydrin. The polymer has a melt viscosity of 2,272 poises at 139° C., an intrinsic viscosity of (0.51), and a tensile strength of 4,900 lbs./sq. in. based on the original dimensions (6,800 lbs./sq. in. based on the dimensions at break).

The total heating cycle required to produce the above polymer was 8.5 hours. At least four days heating is required, when operating on a two-pound scale, to obtain a polymer of comparable molecular weight by the prior art process, i. e., without an agent of the diisocyanate type.

*Example III*

A mixture of 50.43 parts of sebacic acid and 16.81 parts of ethanolamine (10% excess) is heated for 2 hours at 150° C./atm., followed by 6 hours at 200° C./2 mm. The soft, waxy low polymer, in which ester linkages form about 50% of the total of ester and amide linkages between recurring units, which is thus obtained is treated with 3.3 parts of hexamethylene diisocyanate for ½ hour at 176° C. during which time the pressure is gradually reduced to 2 mm. The product is a clear, tough, rubbery polymer which has lost its original solubility, which softens gradually over a wide range instead of melting sharply, and which stretches rather than cold draws. The melt viscosity is too high to determine. The tensile strength is 5,380 lbs./sq. in. based on the original dimensions, (7,690 lbs./sq. in. at break).

*Example IV*

A mixture containing 12.21 parts of ethanolamine, 2.85 parts of pentaglycol, $$HOCH_2C(CH_3)_2CH_2OH$$

(10% excess), and 45.65 parts of sebacic acid is heated for 2 hours at 150° C./atm., followed by 6 hours at 200° C./2 mm. The soft, white waxy polymer, in which ester groups form about 55% of the total of ester and amide linkages between recurring units, which is thus obtained is treated with 3.00 parts of hexamethylene diisocyanate for 15 minutes at 176° C. during which time the pressure is gradually reduced to 2 mm. The product obtained is a clear, colorless, tough polymer. The intrinsic viscosity can not be determined because the polymer is insoluble even after 2 hours heating at 150° C. in cresol. Further evidence of cross-linking is the fact that instead of melting, the polymer merely softens over a wide temperature range. It has a tensile strength of 4,240 lbs./sq. in. based on the original dimensions (5,720 lbs./sq. in. at break).

*Example V*

A mixture containing 13.43 parts of ethanolamine (10% excess), 40.43 parts of sebacic acid and 7.90 parts of hexamethylenediamine-sebacic acid salt is heated for 2 hours at 150° C./atm., followed by 6 hours at 200° C./2 mm. The soft waxy polymer, in which ester linkages form about 45% of the total of ester and amide linkages, which is thus obtained is treated with 3.00 parts of hexamethylene diisocyanate for 15 minutes at 176° C. during which time the pressure is gradually reduced to 2 mm. The product obtained is a clear colorless tough polymer which has lost its original solubility. It is too viscous for melt viscosity determinations. Instead of melting sharply, the polymer softens over a wide temperature range characteristic of cross-linked polymers. The tensile strength is 2,800 lbs./sq. in. based on the original dimensions (4,350 lbs./sq. in. at break).

*Example VI*

A mixture containing 13.16 parts of 6-aminocaproic acid, 13.43 parts of ethanolamine (10% excess) and 40.43 parts of sebacic acid is heated for 2 hours at 150° C./atm., followed by 6 hours at 200° C./2 mm. The soft, waxy polymer, in which ester linkages form about 40% of the total of ester and amide linkages, which is thus obtained is treated with 3.30 parts of hexamethylene diisocyanate for 15 minutes at 170° C. during which time the pressure is gradually reduced to 2 mm. The product is a tough, elastic product which softens slowly over a wide range and which has lost its original solubility. It has a tensile strength of 2,300 lbs./sq. in. based on the original dimensions (4,100 lbs./sq. in. at break).

*Example VII*

Two batches of low molecular weight polymer are made by the following procedure: A mixture containing 142.72 parts of ethylene glycol, 140.44 parts of ethanolamine, 671.96 parts of adipic acid and 100 parts of water is heated for 2 hours at 150° C./atm. followed by 6 hours at 170° C./2 mm. The two batches of soft, tacky polymer, in which ester linkages form about 75% of the total of ester and amide linkages are combined and 1,440 parts of the homogenized mixture is treated with 75 parts of hexamethylene diisocyanate in a Werner and Pfleiderer mixer at 175° C. for 45 minutes. While still hot, the tough, rubbery polymer is removed from the mixer and cut up into small pieces so that it can be put through a rubber mill. The milled sheets resemble crepe rubber in appearance. They can be plate pressed on a Carver press at 150° C. to smooth elastic sheets resembling soft, vulcanized rubber.

Kneading and milling processes have long been used as standard methods for the dispersion of modifying agents in rubber, cellulose derivatives and alkyd resins. However, these methods present certain difficulties when applied to high molecular weight polyester-amides. When hot they stick to the rolls and when cold they have too low a degree of coherence for milling purposes. The milling problem is further complicated by the fact that the modifying agents are not uniformly dispersed. These disadvantages may be obviated by mixing the modifying agents with a partially formed polymer, i. e., a low molecular weight polymer, while it is still soft and workable and then "finishing off" the polymerization later with a diisocyanate. By this procedure, the low molecular weight polymer penetrates into the modifying agents and produces a much more uniform and firmly bound product than is obtained by mill-mixing the agents into the finished product.

When low molecular weight polyester-amides are mixed with reactive modifying agents and then treated with diisocyanates, a new type of polymer is formed in which the modifying agent is chemically united with the polyester-amide rather than being merely mixed with it. By reactive modifying agents are meant those containing reactive hydrogens, e. g., cellulose acetate, cellulose nitrate, cellulose ethers, viscose, casein, zein, soya protein, polyvinyl alcohol, and wood flour. When inert modifying agents are used in the process, they merely act as fillers although they do serve to improve such properties of the polymers as the nerve, surface pattern, toughness, color and working properties, depending upon the nature of the modifying agent. Among the more important inactive fillers might be mentioned carbon black, clay, asbestos, lithopone, mica, zinc oxide, titanium oxide, whiting, red iron oxide, magnesia, and litharge. The incorporation of representative modifying agents by the process of this invention is exemplified below. Examples VIII to X disclosing essentially inert modifying agents, and Examples XI and XII disclosing reactive modifying agents.

*Example VIII*

Two batches of low molecular weight polymer are made by the following procedure: A mixture containing 195.5 parts of ethylene glycol, 109.9 parts of ethanolamine, 723.1 parts of adipic acid and 100 parts of water is warmed gradually to 170° C., permitting the water to distill off. The reaction mixture is then heated for 2 hours at 170° C. followed by 6 hours at 170° C./ mm. The two batches of soft, tacky low molecular weight polymer, in which ester linkages form about 81% of the total of ester and amide linkages, are combined and 1,600 parts of the homogenized mixture (acid number 29.1) is mixed with 240 parts of bone black and 80 parts of hexamethylene diisocyanate and then "finished off" in a Werner and Pfleiderer mixer at 200° C. over a period of one hour. The product thus obtained is a tough, rubbery polymer which can be rolled into flat sheets by means of a rubber mill.

*Example IX*

A mixture containing 142.72 parts of ethylene glycol, 140.44 parts of ethanolamine, 671.96 parts of adipic acid and 100 parts of water is warmed gradually to 170° C., permitting the water to distill off. The reaction mixture is then heated for 12 hours at 170° C. followed by 6 hours at 200° C./2 mm. The product at this stage is a soft, fluorescent wax having an acid number of 24.3. A total of 700 parts of this wax, in which ester linkages form about 75% of the total of ester and amide linkages is mixed with 140 parts of lithopone and 35 parts of hexamethylene diisocyanate and "finished off" in a Werner and Pfleiderer mixer at 200° C. over a period of one hour. The product thus obtained is a smooth, white, rubbery polymer which can be readily milled into sheets on a rubber mill.

*Example X*

A mixture containing 142.72 parts of ethylene glycol, 140.44 parts of ethanolamine, 671.96 parts of adipic acid and 100 parts of water is heated for 2 hours at 170° C. followed by 6 hours at 200° C./2 mm. The resulting soft, tacky wax has an acid number of 24.3 and a hydroxyl number of 27.5. Six hundred sixty parts of this wax, in which ester linkages form about 75% of the total of ester and amide linkages is mixed with 130 parts of shredded asbestos and 33 parts of hexamethylene diisocyanate and "finished off" in a Werner and Pfleiderer mixer at 200° C. over a period of one hour. The product is a tough, elastic polymer which can be milled into sheets resembling rubber.

*Example XI*

(a) Two batches of low molecular weight polymer are made by the following procedure: A mixture containing 195.5 parts of ethylene glycol, 109.9 parts of ethanolamine, 723.1 parts of adipic acid and 100 parts of water is heated for 2 hours at 170° C./atm. followed by 6 hours at 170° C./2 mm. The two batches of wax, in which ester linkages form about 81% of the total of ester and amide linkages, were combined and 840 parts of the homogenized mixture (acid number 29.2) was mixed with 42 parts of hexamethylene diisocyanate and 2 parts of cobalt naphthenate and heated for a period just long enough to get the reaction started. At this point, two separate portions of the mixture were treated as follows:

(b) One portion containing 300 parts of the mixture obtained in (a) above is dissolved in 454 parts of chloroform and then mixed in a Werner and Pfleiderer mixer with 200 parts of cellulose acetate which has been swollen in one liter of acetone. The solvents soon evaporate and the homogeneous mixture is heated at 200° C. with mixing for approximately one hour. The product thus obtained is a tough, high molecular weight polymer which can be milled or plate pressed into strong, smooth sheets.

(c) The second portion likewise containing 300 parts of the mixture obtained in (a) above is dissolved in 454 parts of chloroform and then mixed in a Werner and Pfleiderer mixer with 200 parts of leather scrap which has been soaked in 454 parts of chloroform. The solvents soon evaporate having a homogeneous mixture which is "finished off" at 200° C. over a period of approximately one hour. The final product is a tough, elastic mass which can be milled into thin sheets on a rubber mill. These sheets can be plate pressed to smooth, tough films resembling leather.

*Example XII*

A mixture containing 195.5 parts of ethylene glycol, 109.9 parts of ethanolamine, 723.1 parts of adipic acid and 100 parts of water is heated for 2 hours at 170° C./atm. followed by 6 hours at 200° C./2 mm. The product at this stage is a soft, fluorescent wax having an acid number of 10.4. Seven hundred parts of this wax, in which ester linkages form about 81% of the total of ester and amide linkages, is mixed with 35 parts of hexamethylene diisocyanate and reacted at 200° C. in a Werner and Pfleiderer mixer for about thirty minutes. At this stage, 140 parts of polyvinyl alcohol is added and the polymerization is continued for an additional hour at 200° C. or until it becomes quite tough. This material is more thermoplastic than the other modified polyester-amides.

In the above examples hexamethylene diisocyanate is used for convenience as the diisocyanate reactant but any organic diisocyanate or diisothiocyanate may be used in its place, including monoisocyanate-monoisothiocyanates, i. e., any compound of the general formula XCNRNCY where X and Y are selected from the group consisting of sulfur and oxygen and R is a divalent organic radical. The invention thus includes the use of ethylene diisocyanate, trimethylene diisocyanate, tetramethylene diisocyanate, hexamethylene diisocyanate, decamethylene diisocyanate, heptylidene diisocyanate and the corresponding diisothiocyanates; cycloalkylene diisocyanates and diisothiocyanates, e. g. cyclopentylene diisocyanate, cyclohexylene diisocyanate; aromatic diisocyanates and diisothiocyanates, e. g. m-phenylene diisocyanate, naphthalene diisocyanate and diphenyl-4,4'-diisocyanate; aliphatic-aromatic diisocyanates and diisothiocyanates, e. g. xylene-1,4-diisocyanate and 4,4'-diphenylene-methane diisocyanate; and diisocyanates and diisothiocyanates containing hetero-atoms, such as SCNCH$_2$OCH$_2$NCS and SCN—(CH$_2$)$_3$—S—(CH$_2$)$_3$NCS The preferred diisocyanates and diisothiocyanates are of the type OCN—R—NCO and SCN—R—NCS, wherein R represents saturated divalent hydrocarbon radicals with a chain length of at least two carbon atoms. Of these the polymethylene derivatives are preferred.

While diisocyanates and diisothiocyanates are preferred because of their greater availability and the readiness with which they react, the invention is generic to compounds of the type R(NCX)$_z$ where X is oxygen or sulfur i. e., a chalcogen (J. Am. Chem. Soc. 63, 892 (1941)) of atomic weight less than 33, and z is a plural integer, i. e., more than one, including compounds having at least one isocyanate and at least one isothiocyanate group. The invention thus includes the use of polyisocyanates and polyisothiocyanates, e. g., benzene-1,2,4-triisothiocyanate and 1,2,2-triisocyanatobutane.

The lower polymer acted upon by the diisocyanate or diisothiocyanate is made from ingredients comprising a dibasic carboxylic acid or an ester-forming derivative thereof, e. g., a halide, anhydride or an ester with a volatile monohydric alcohol with a complementary bifunctional esterifiable compound in which at least one function is an alcohol.

Any dibasic carboxylic acid or ester-forming derivative thereof may be employed to form the low polymers acted upon by the diisocyanate including carbonic, malonic, succinic, maleic, glutaric, suberic, azelaic, β-methyl adipic hexahydroterephthalic, diphenic, p-phenylenediacetic, thiodibutyric, acetonedicarboxylic diglycollic, pimelic, undecanedioic, isophthalic acid, brassilic, 6-ketoundecanedioic, and 4-ketopimelic acids and anhydrides, acid halides, half-esters and diesters thereof.

The preferred dibasic acids are of the formula HOOC—R—COOH wherein R represents a saturated divalent hydrocarbon radical with a chain length of at least four carbon atoms.

The second essential component of the low molecular weight polymer is the complementary bifunctional esterifiable compound having one alcohol group, the other function being alcoholic or amino. Thus glycols and amino alcohols may be employed.

Any glycol may be employed in the formation of the low polymer, including, in addition to those indicated in the examples, diethylene glycol, triethylene glycol, pentamethylene glycol, hexamethylene glycol, decamethylene glycol and N,N-diethanolaniline.

Any amino alcohol having at least one hydrogen atom attached to the amino nitrogen atom may be employed including aromatic amino alcohols, e. g., p-hydroxymethylbenzylamine, 4-hydroxymethyl-4-aminomethyldiphenyl and p-aminophenylethyl alcohols; aliphatic amino alcohols, e. g., 5-aminopentanol-1; 6-amino-5-methylhexanol-1, 4(p-aminophenyl) cyclohexanol, hydroxyethoxyethoxyethylamine, and N-(β-aminoethyl)-N(ω-hydroxyhexyl)-aniline.

The preferred amino alcohols are of formula HO—R—NH$_2$ where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

The term polymer connotes a certain minimum sum of the radical lengths of the dibasic carboxylic acid and glycol or amino alcohol. The radical length of the acid is the number of atoms in the chain between and including the carboxyl carbons. The radical length of the glycol is the number of atoms in the chain between and including the hydroxyl oxygens. The radical length of the amino alcohol is the number of atoms between and including the amino nitrogen and the hydroxyl oxygen. Thus in the polymer

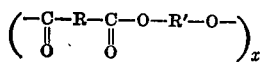

the structural unit is

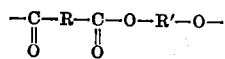

and the unit length is the sum of the radical lengths of the acid whose residue in the polymer is

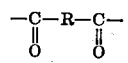

and of the glycol whose residue in the polymer is

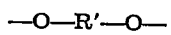

Similarly the structural unit of a polymer obtained from a dibasic acid and an amino alcohol is

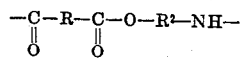

the unit length of which is the sum of the radical lengths of the acid and the amino alcohol. The unit length, as thus defined, of the polymer is at least seven.

Optional bifunctional components include diamines, amino acids, and hydroxy acids.

Any diamine may be employed, which contains at least one hydrogen atom attached to each amino nitrogen atom. The preferred diamines are of formula $NH_2RNH_2$ where R represents saturated divalent hydrocarbon radicals with a chain length of at least two carbon atoms, e. g., ethylenediamine, hexamethylenediamine, 3-methylhexamethylene-diamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula HO—R—COOH where R represents saturated divalent hydrocarbon radicals, e. g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

A principal advantage of the present invention is that the addition of a small amount of diisocyanate to a low molecular weight polymer serves to shorten greatly the time necessary to produce a tough, elastic, high molecular weight polymer from a period of several days to a reasonable and commercially practical period of eight hours. The difference in time of reaction becomes even larger as the scale of operation is increased. When operating with batches exceeding three pounds, more than a week is required to obtain a high molecular weight product by the prior art method. The present process, on the other hand, can be carried out almost as readily on a large scale as on a small scale.

The products of this invention have better durability on aging than those prepared by the method of the prior art. The cross-linked polymers have a further advantage in that they will take up a large quantity of plasticizer without losing their tensile strength.

The tough, high molecular weight polymers obtained by the present process are particularly useful for the production of filaments, bristles, films, tubing, coating agents, e. g., for cloth, paper, leather, wood, metal and wire (as electrical insulation). Furthermore, they are well adapted for use in the manufacture of safety glass interlayers since they are capable of being molded into clear, tough, elastic sheets which adhere tenaciously to glass.

In these and other uses the polymers may be admixed with other polymers, resins, plasticizers, fillers, pigments, dyes, etc. either before or after the final diisocyanate "finishing off" process as indicated in certain of the examples.

The term "linear" as used herein implies only those polymers obtainable from bifunctional reactants. The structural units of such products are linked end-to-end and in chain-like fashion. The term is intended to exclude three-dimensional polymeric structures, such as those that might be present in polymers derived from triamines, from trihydric alcohols, or from tribasic acids.

The term "dibasic dicarboxylic acid" in the claims is intended to include ester-forming derivatives thereof since these are equivalents in the present situation in that the polymer is the same whether derived from the acid or the derivative. The term "complementary bifunctional reactant" is used to define the material which reacts with the dibasic acid or derivative thereof to form the polymer. The term "active hydrogen" is used herein to define hydrogen in an organic compound attached to oxygen, nitrogen, sulfur, etc. determinable by the Zerewitinoff method, e. g., as perfected by Kohler et al., J. Am. Chem. Soc. 49 3181 (1927).

As many apparently widely different embodiments of this invention may be made without departing from the spirit and scope thereof, it is to be understood that we do not limit ourselves to the specific embodiment thereof except as defined in the appended claims.

What is claimed is:

1. Process which comprises heating at reaction temperature an organic compound having as its sole reacting groups a plurality of —NCX groups wherein X is a chalcogen of atomic weight below 33, with a linear polymeric material, having a unit length of at least seven and recurring ester linkages in amount from about 40% to 100% of the linkages uniting the structural units of the polymer, prepared from bifunctional ingredients including a dibasic carboxylic acid and a complementary bifunctional reactant in which one of the functional groups is an hydroxyl group and the other functional group is selected from the class consisting of the hydroxyl group and the hydrogen bearing amino group.

2. Process which comprises heating at reaction temperature a linear polymeric ester having recurring intralinear carboxylic acid ester groups in amount from about 40% to 100% of the linkages uniting the structural units of the polymer and having a unit length of at least seven, with an organic compound having as its only reacting groups a plurality of —NCX groups wherein X is a chalcogen of atomic weight below 33.

3. Process which comprises heating at reaction temperature a linear polyester-polyamide having a unit length of at least seven and recurring intralinear carboxylic acid ester groups and carbonamido groups, the recurring ester groups being present in amount from about 40% to 100% of the total amount of ester and carbonamido groups, with an organic compound having as its sole reacting groups a plurality of —NCX groups wherein X is a chalcogen of atomic weight below 33.

4. Process of claim 3 wherein the temperature is between 75° C. and 300° C.

5. Process which comprises heating at reaction temperature a low molecular weight linear polyester-polyamide having a unit length of at least seven and recurring intralinear carboxylic acid ester groups and carbonamido groups, the recurring ester groups being present in amount from about 40% to 100% of the total amount of ester and carbonamido groups, with an organic diisocyanate having the —NCO groups as its sole reacting groups.

6. Process which comprises heating at reaction temperature a low molecular weight linear polyester-polyamide having a unit length of at least seven and recurring intralinear carboxylic acid ester groups and carbonamido groups, the recurring ester groups being present in amount from about 40% to 100% of the total amount of ester and carbonamido groups, with 3 to 7% of an organic compound having as its sole reacting groups two —NCX groups where X is a chalcogen of atomic weight below 33.

7. A tough, high molecular weight, polymeric reaction product of an organic compound having as its sole reacting groups a plurality of —NCX groups wherein X is a chalcogen of atomic weight below 33, and a low molecular weight linear polymeric material having a unit length of at least seven and recurring intralinear carboxylic acid ester linkages in amount from about 40% to 100% of the linkages uniting the structural units of the polymer, prepared from bifunctional ingredients including a dibasic carboxylic acid and a complementary bifunctional reactant in which one of the functional groups is an hydroxyl group and the other functional group is selected from the class consisting of the hydroxyl group and the hydrogen bearing amino group.

8. A tough, high molecular weight, polymeric reaction product of an organic diisocyanate having the two —NCO groups as its sole reacting groups and a low molecular weight linear polymeric ester having a unit length of at least seven and recurring intralinear carboxylic acid ester groups in amount from about 40% to 100% of the linkages uniting the structural units of the polymer.

9. A tough, high molecular weight, polymeric reaction product of an organic diisocyanate having the two —NCO groups as its sole reacting groups and a low molecular weight linear polyester-polyamide having a unit length of at least seven and recurring carboxylic acid ester groups and carbonamido groups, the recurring ester groups being present in amount from about 40% to 100% of the total amount of ester and carbonamido groups.

10. A tough, high molecular weight, polymeric reaction product of an organic diisocyanate having the two —NCO groups as its sole reacting groups and a low molecular weight linear polymeric material, having a unit length of at least seven and recurring ester linkages in amount from about 40% to 100% of the linkages uniting the structural units of the polymer, prepared from bifunctional ingredients including a dibasic carboxylic acid and a small excess of a complementary bifunctional reactant in which one of the functional groups is an hydroxyl group and the other functional group is selected from the class consisting of the hydroxyl group and the hydrogen bearing amino group.

11. A tough, high molecular weight, polymeric reaction product of an organic diisocyanate having the two —NCO groups as its sole reacting groups and a low molecular weight linear polymeric material, having a unit length of at least seven and recurring ester linkages in amount from about 40% to 100% of the linkages uniting the structural units of the polymer, prepared from a dibasic carboxylic acid, a glycol, and a diamine.

12. Process which comprises heating at reaction temperature a low molecular weight linear polyester-polyamide having a unit length of at least seven and recurring intralinear carboxylic acid ester groups and carbonamido groups, the recurring ester groups being present in amount from about 40% to 100% of the total amount of ester and carbonamido groups, with an organic compound having as its sole reacting groups two —NCX groups where X is a chalcogen of atomic weight below 33 until the product becomes substantially insoluble but is still fusible.

13. Process of increasing the molecular weight and toughness of linear polymers having a unit length of at least seven and containing active hydrogens and carboxylic acid ester linkages in amount from about 40% to 100% of the linkages uniting the structural units of the polymer which comprises heating said polymers to reaction temperature, with an organic compound having as its sole reacting groups two —NCX groups where X is a chalcogen of atomic weight below 33.

14. A polymeric reaction product, of increased toughness and molecular weight, of a linear polymer having a unit length of at least seven and containing active hydrogens and intralinear carboxylic acid ester linkages in amount from about 40% to 100% of the linkages uniting the structural units of the polymer, and an organic compound, having as its sole reacting groups two —NCX groups wherein X is a chalcogen of atomic weight below 33.

15. Process which comprises heating at reaction temperature a compound of the formula

$$R(NCX)_2$$

wherein R is a saturated divalent hydrocarbon radical having a chain length of at least two carbon atoms and X is a chalcogen of atomic weight below 33 with a linear polymeric material having a unit length of at least seven and recurring ester linkages in amount from about 40% to 100% of the linkages uniting the structural units of the polymer and being prepared from bifunctional ingredients including a dibasic carboxylic acid and a complementary bifunctional reactant in which one of the functional groups is an hydroxyl group, and the other functional group is selected from the class consisting of the hydroxyl group and the hydrogen bearing amino group.

16. Process which comprises heating at reaction temperature an organic compound which has a plurality of —NCX groups wherein X is a chalcogen of atomic weight less than 33, but which is otherwise free from reactive groups, with a composition containing a linear polymeric material having a unit length of at least seven and recurring intralinear carboxylic acid ester groups in amount from about 40% to 100% of the linkages uniting the structural units of the polymer and being prepared from bifunctional ingredients including a dibasic carboxylic acid and a complementary bifunctional reactant in which one of the functional groups is an hydroxyl group and the other functional group is selected from the class consisting of the hydroxyl group and the hydrogen bearing amino group, said composition also containing a polymeric organic modifying agent which has groups containing active hydrogen.

17. Process which comprises heating at reaction temperature an organic compound which has a plurality of —NCX groups, wherein X is a chalcogen of atomic weight less than 33, but which is otherwise free from reactive groups, with a composition containing a linear polymeric material having a unit length of at least seven and recurring intralinear carboxylic acid ester groups in amount from about 40% to 100% of the linkages uniting the structural units of the polymer and being prepared from bifunctional ingredients including a dibasic carboxylic acid and a complementary bifunctional reactant in which one of the functional groups is an hydroxyl group and the other functional group is selected from the class consisting of the hydroxyl group and the hydrogen bearing amino group, said composition also containing an inert modifier.

18. Process which comprises heating at reaction temperature an organic diisocyanate having the two —NCO groups as its sole reacting groups with a low molecular weight linear polyester-polyamide having a unit length of at least seven and and recurring intralinear carboxylic acid ester groups and carbonamido groups, the recurring ester groups being present in amount from about 40% to 100% of the total amount of ester and carbonamido groups and the polyester-polyamide being prepared from a dibasic carboxylic acid, a glycol, and an amino alcohol.

19. A tough, high molecular weight, polymeric reaction product of an organic diisocyanate having the two —NCO groups as its sole reacting groups and a low molecular weight linear polymeric material having a unit length of at least seven and recurring ester linkages in amount from about 40% to 100% of the linkages uniting the structural units of the polymer and prepared from a dibasic carboxylic acid, a glycol, and an amino alcohol.

ROBERT EDWARD CHRIST.
WILLIAM EDWARD HANFORD.

CERTIFICATE OF CORRECTION.

Patent No. 2,333,639. November 9, 1943.

ROBERT EDWARD CHRIST, ET AL.

It is hereby certified that error appears in the printed specification of the above numbered patent requiring correction as follows: Page 1, first column, line 40, after "By" strike out "the"; page 2, second column, line 35, for "7690" read --7960--; line 39, for "2.85" read --2.95--; page 3, second column, line 24, before "mm" insert --2--; page 5, second column, line 32, for "inculde" read --include--; and that the said Letters Patent should be read with this correction therein that the same may conform to the record of the case in the Patent Office.

Signed and sealed this 11th day of January, A. D. 1944.

Henry Van Arsdale,
Acting Commissioner of Patents.

(Seal)